Jan. 19, 1954 J. GAUCI ET AL 2,666,459
MACHINE FOR PRODUCING SPRING MATTRESSES
Filed June 29, 1948 10 Sheets-Sheet 1

INVENTOR.
JOSEPH GAUCI
PAUL J. MUELLER
BY Howard J. Whelan,
ATTORNEY

Jan. 19, 1954   J. GAUCI ET AL   2,666,459
MACHINE FOR PRODUCING SPRING MATTRESSES
Filed June 29, 1948   10 Sheets-Sheet 2

INVENTOR.
JOSEPH GAUCI
PAUL J. MUELLER
BY Howard J. Whelan.
ATTORNEY

Jan. 19, 1954 J. GAUCI ET AL 2,666,459
MACHINE FOR PRODUCING SPRING MATTRESSES
Filed June 29, 1948 10 Sheets-Sheet 4

INVENTOR.
JOSEPH GAUCI
PAUL J. MUELLER
BY Howard J. Whelan
ATTORNEY

Jan. 19, 1954 J. GAUCI ET AL 2,666,459
MACHINE FOR PRODUCING SPRING MATTRESSES
Filed June 29, 1948 10 Sheets-Sheet 5

INVENTOR.
JOSEPH GAUCI
PAUL J. MUELLER
BY Howard J. Whelan,
ATTORNEY

Jan. 19, 1954 J. GAUCI ET AL 2,666,459
MACHINE FOR PRODUCING SPRING MATTRESSES
Filed June 29, 1948 10 Sheets-Sheet 6

INVENTOR.
JOSEPH GAUCI
PAUL J. MUELLER
BY Howard J. Whelan,
ATTORNEY

Jan. 19, 1954     J. GAUCI ET AL     2,666,459
MACHINE FOR PRODUCING SPRING MATTRESSES
Filed June 29, 1948     10 Sheets-Sheet 9

INVENTOR.
JOSEPH GAUCI
PAUL J. MUELLER
BY Howard J. Whelan,
ATTORNEY

Patented Jan. 19, 1954

2,666,459

UNITED STATES PATENT OFFICE 2,666,459

MACHINE FOR PRODUCING SPRING MATTRESSES

Joseph Gauci, New York, N. Y., and Paul J. Mueller, Baltimore, Md., assignors to Murray J. Rymland, Baltimore, Md.

Application June 29, 1948, Serial No. 35,954

2 Claims. (Cl. 140—92.8)

This invention relates to a production machinery used for the assembling of springs to form bed mattresses.

It has for an object the construction of a new and improved mattress assembling machine that will avoid one or more of the disadvantages and limitations of the prior art.

Another object of this invention is to provide a new and improved mattress assembling machine that will arrange for the fastening of the coil springs of a mattress together, in an effective and economical manner.

A further object of the invention is to provide a new and improved mattress machine that can automatically fasten the coil springs of a spring mattress together and do this in continuous rows until the mattress is completed.

An additional object of this invention is to provide a new and improved spring mattress making machine that will tie together the coil springs used for the mattress by a new and simple fastening means that will render the coils more comfortable and flexible to use than previous types of fasteners.

Still another object of the invention is to provide a new and improved spring mattress making machine that will form and thread a helically formed wire through the coils of springs that form an unassembled mattress and tie them together with helically formed wire through the coils proper where they are overlapped to provide the necessary junction between them for the assembly.

Other objects will become apparent as the invention is more fully set forth.

For a better understanding of the invention, its objects and the principles thereof, reference is made to the accompanying drawings, wherein a particular embodiment of the invention is indicated by way of example. These drawings, with the following description, outline the invention in detail while the scope of the invention is emphasized in the claims.

Referring to the drawings.

Similar reference characters refer to the same parts throughout the drawings.

In the construction of mattresses of the spring type, in one method, it is customary to bring the individual coil springs into a vertical position adjacent to each other, so the large end turn at either end of the coiled springs will touch each other at a portion of their adjacent peripheries. Then a clip of strap material is placed against these portions and overlapped around the wire of these portions. This is a cheap and effective way of doing the work of fastening the coiled springs together and can only be done with tools and methods required specifically for the purpose. The clips have sharp edges that tend to tear into the covers placed on the finished mattresses. They may also injure the workers during manufacture, and the users when in operation as the foundation for a bed. The clips also form a flat surface that is objectionable and its flexibility is of a see-saw nature. They also have a tendency to scrape and scratch audibly as the mattress is used. If the clips become opened, as they occasionally do, the edges and ends present knife-like cutting edges that are very injurious to anyone that may accidently come against them. Also the clips can become loose and detached and fall down in between the coils leaving the springs that they had originally held together, free to separate from each other at the ends loosened.

In this invention, the coiled springs have their end turns overlapped one on the other, and then fastened together by a small diameter helical spring threaded around the wire of the turns, at each end of the coiled springs to be joined. The fastening is performed by the mattress assembling machine embodying this invention, by forming the wire into a continuous helical coil moving progressively in a horizontal plane in between the end turns of the vertical coiled springs forming the mattress, so as to wind around the wires of these turns and bind them together. The machine is further provided with a moving frame that propels the fastened coiled springs onward in rows as the fastening of each set of rows is completed. The machine serves as a holder and spacer for the coils during their fastening process and thereby keeps them in proper alignment.

Referring to the structure shown in the drawings, a base 21, serves as the lower connecting frame of a mattress coil assembling and fastening machine. The main frame work 22 extending from the base 21 raises the horizontal operating level of the machine to a suitable height above the floor. At this level, the framework has a horizontal platform 19 forming a table or plane on which the products are processed. On this platform are situated brackets 23 having bearings 24 in which shafts 25 rotate. The shafts 25 have sprocket wheels 41 and are rotated by them as they are rotated by carrier belts 20 when engaged and actuated in a manner to be described later.

Figure 1:
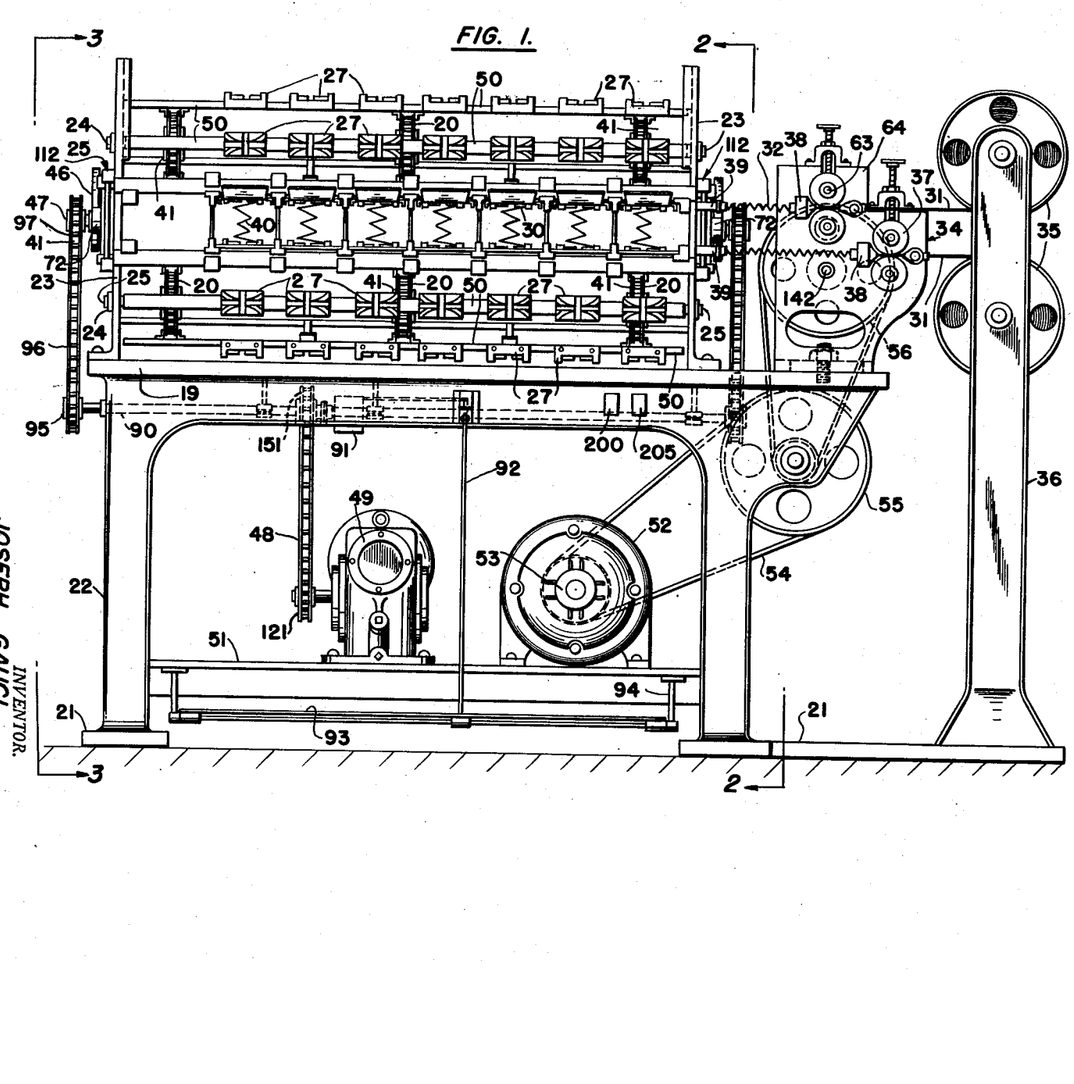
Figure 1 is a front elevation of a mattress spring assembling machine embodying this invention.
Figures 2, 3, 6:
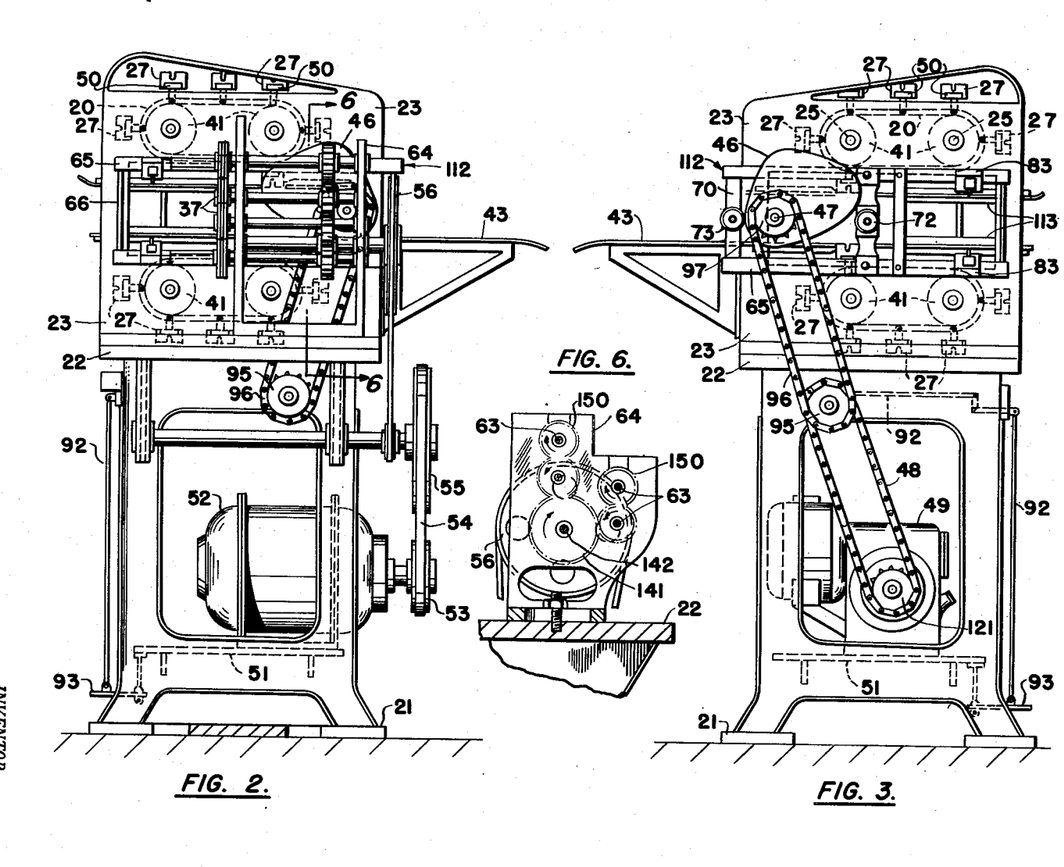
Figure 2 is a right end view looking in the direction of arrows 2—2 shown on Figure 1.
Figure 3 is a left end view looking in the direction of arrows 3—3 on Figure 1.
Figure 6 is a section of the wire feeding mechanism taken along line 6—6 of Figure 2.
Figures 4, 5:
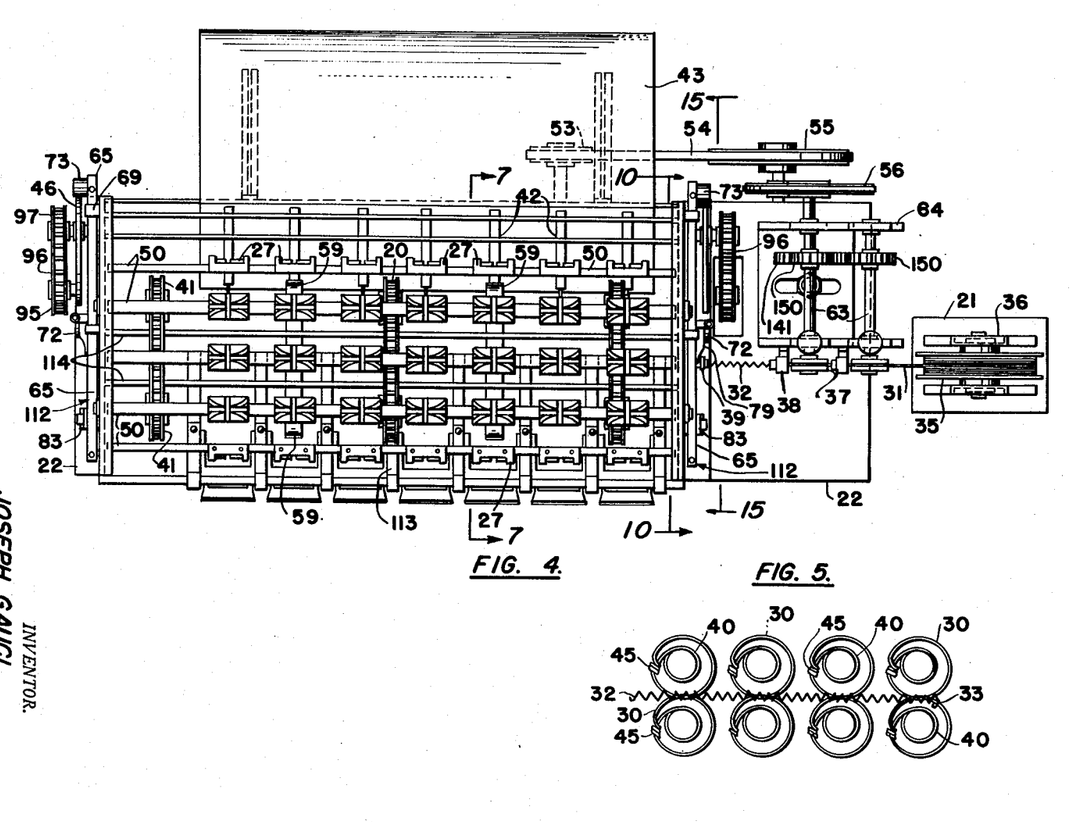
Figure 4 is a top plan view of Figure 1.
Figure 5 is an enlarged typical view showing two rows of assembled springs.
Figure 7:
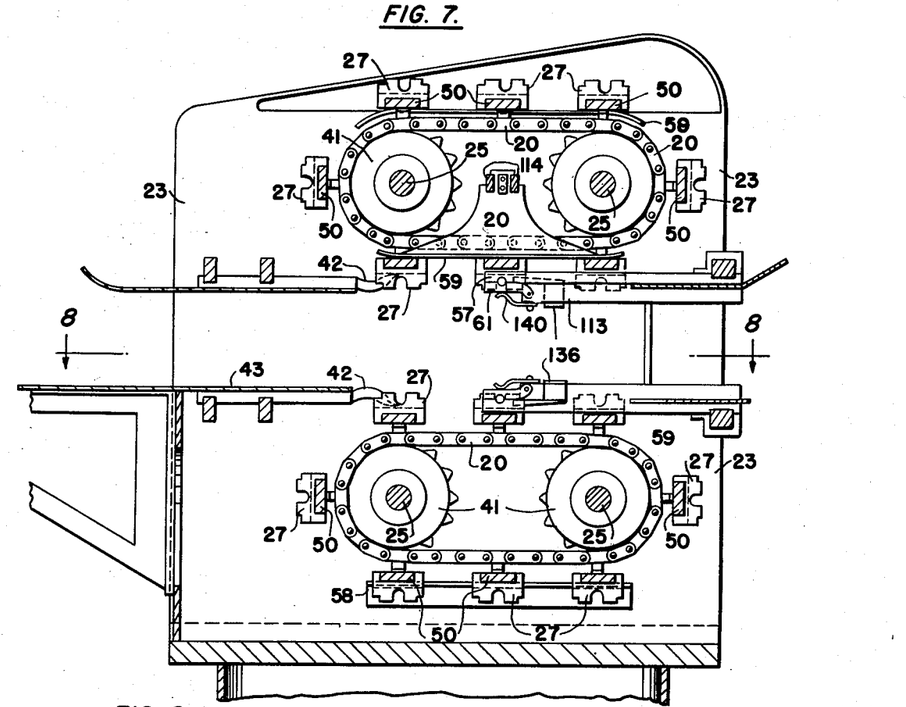
Figure 7 is a section taken on the line 7—7 of Figure 4.

These belts 20 support bars 50 which have pads 27 mounted thereon. The pads 27 are suitably grooved at 28 on their faces to receive the end turns 30 of mattress spring 40. The grooves 28 serve to hold a pair of the coils 30 in place in a horizontal position in such a way as to overlap the turns of the adjacent coils 30 one on the other. (See Figures 23, 24, and 25.) While in this overlapped position, the rotative insertion transversely in a horizontal plane of a wire 31 formed into a small helical diameter 32 will join the wire of each pair of coils and bind them together. In binding these coil wires 30 together the inserted helix 32 in each case is twisted in and around the coils 30 where they touch and resiliently adjust the helix to the varying spacing of the coils as they leave the point of tangency. When sufficient length of the helix 32 is inserted, it is cut off and the end portions 33 bent over to secure them from loosening. Each helical binding spring 32 is derived from a wire feeding mechanism 34, that consists of an upright bracket 36 supporting reels 35 of suitable wire 31 passing between rolls 37 and then through the forming dies or twisters 38. The helical springs 32 leave the dies or twisters 38 in an extending coil, sufficiently stiff to carry itself horizontally and able to engage the turns 30 and twist around them to form a binder as it is twisted and propelled. To make the helical wire 32 join up on the turns, a guide tube 39 is preferably included to provide a positive alignment of the helical spring 32 with the portions of the turns 30 that it is intended to twist around and bind together. This takes care of any tendency in the wire 32 to bend and droop, that may exist during its processing just prior to its movement towards the coils. It should be noted that the helical spring 32 travels tangentially to the turns 30 and is not in line with the axis of the spring coils 30. The helical spring 32 also travels through all the pairs of coils in a row, which may be usually, from seven to ten, and winds about the turns consecutively until the last one in the row is engaged. The helical spring 32 in each instance, therefore, is long enough to reach from one end of one row to the other and tie the coils 30 of the row in a predetermined spaced arrangement. The coils 30 of each row are then said to be "threaded" together. When each row of paired coils 30 are threaded and the helical spring 32 is bent and cut to complete it, the row is propelled rearwardly a predetermined length for ejection from its pads 27. The propelling is accomplished by a movement of the pads 27 rearwardly on which pads the coils 30 are loaded and have been fastened together. The pads 27 on which the coils 30 rest are engaged by a special carriage having bars 50 attached to the belts 20, that rotate the shafts 25 by means of sprockets 41 in one direction in ratchet fashion. This arrangement brings the fastened springs 40 to a set of fingers 42 that slip in under the turns 30 and disengage them from the pads 27 sufficiently to cause them to move onto a chute 43 that guides and discharges the assembled unit from the machine. This movement brings another set of pads 27 into proper alignment with the helical threading means 32 ready for fastening the next row of springs. The pads 27 are arranged with special grooves 44 designed to allow the fingers 42 to operate therein in the proper sequence, in the manner described. The fingers 42 are curved to fit under the wire 30 of the turns and give a lifting action thereto as the coils are pushed against them. The chute 43, shaft 25, brackets 23 and bearings 24 are mounted on the plate frame 22 suitably designed to carry or support them. The springs 40 are placed on the pads manually in this form of the invention. They have to be so placed in a way that will bring their knots 45 in a predetermined position and the coil turn 30 symmetrically located with respect to each other for which the groovings 28 in the pads are designed. The carriages 112 are propelled by suitably formed cams 46 mounted on a shaft 47 on the brackets 23 and actuated through a transmission chain 48 by an electrical motor 49. The motor 49 is connected to an electrical network operating in accordance with a predetermined schedule. It is secured to an inner platform 51 assembled in the frame 22. Another motor 52 is used for operating the wire feed mechanism 34 and is likewise supported on the platform 51. This motor 52 operates a pulley 53, transmission belt 54 and pulleys 55 and 56 respectively. The helical spring coils 32 are held rigidly on the pads 27 by clips 57 and caps 61 held closed by spring 140 attached to channels 113 extending into the space under the sets of bars 50 employed for transporting the springs 40. The helices 32 are pulled out of the caps 61 when the springs 40 move backwards. The guide plates 59 are also mounted on the brackets 23 by means of bars 114 and serve to protect and guide the bars 50 as they rotate with their pads 27, on the sprockets 41. It can be seen in Figure 1 that two lines of wire 31 upper and lower are fed to the upper and lower coils 30 in the pads, at a time. The wires 31 are twisted in the special dies 38 and led, after being helically formed as at 32 to the tubes 39 that guide them to the fastening place for the coils. The normal movement of the bars 50 is equivalent to a 90° movement of the sprockets 26, when each position is travelled to.

After a travel of this amount the pads 27 are stopped and those next in line are placed for another filling with springs 40, by the operator. The details of the wire feed mechanism structure are conventional for feeding and twisting the wires into the helical form mentioned. Its rollers 37 are held adjustably in regard to each other, to straighten and feed the wires as they pass into the dies 38 in each instance. The rollers 37 are supported on shafts 63 mounted on bracket structures 64 attached to the horizontal platform 19, and aligned with the reels or spools 35 supplying the wire.

Figures 20, 21, 22:
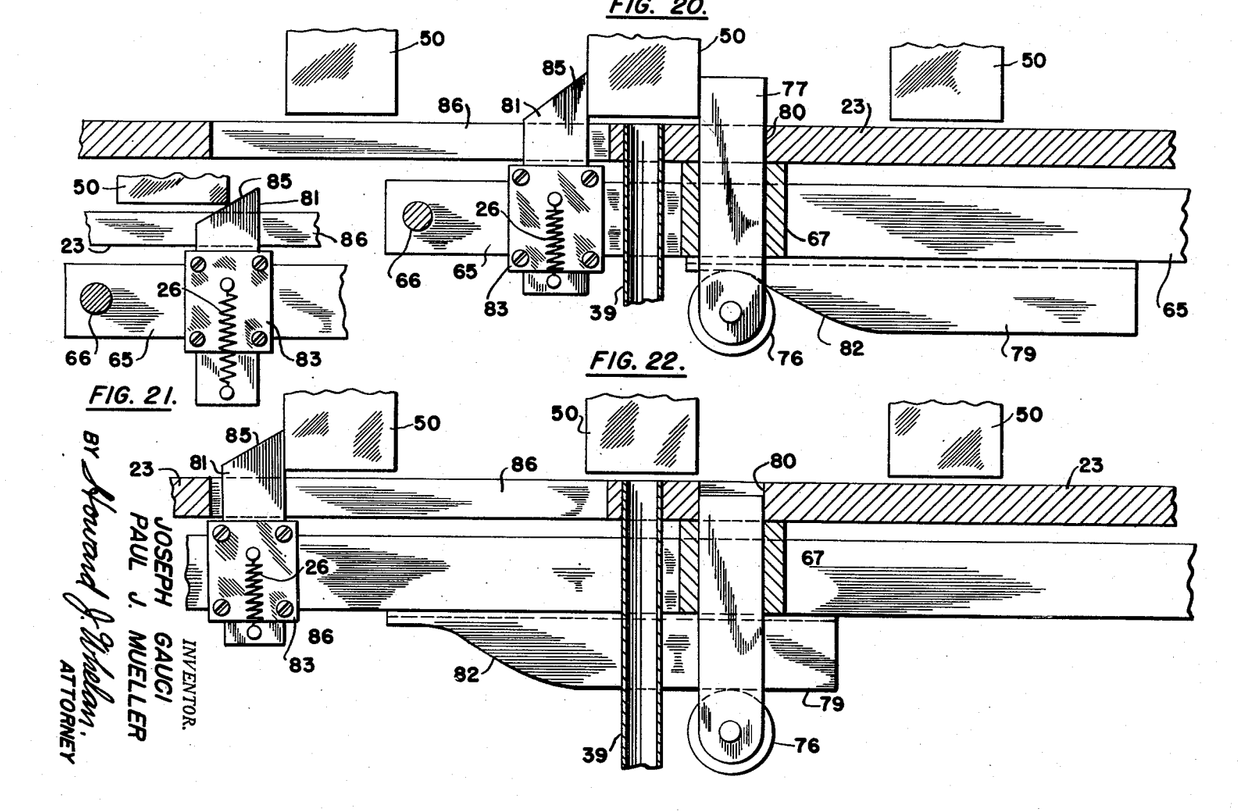
Figure 20 is a plan view taken on the line 20—20 of Figure 17 and showing the carriage in feeding position.
Figure 21 is a plan view partially showing the carriage and tapered dog in an intermediate point of forward travel.
Figure 22 is a plan view showing the carriage at its extreme forward point of travel.

The carriages 112 supply the mechanism for operating the bars 50, and consist of a rectangular frame having lateral bars 65 extending longitudinally with cross bars 66, 68 and 70 positioned vertically respectively. The cross-bars 66 and 70 form the ends of the carriage. A stationary cross-bar 69 serves to support the shaft 47 that rotates the cams 46. The cams in their rotation rub on and propel the rollers 72 and 73 respectively, which are in turn mounted on the cross-bars 68 and 70. The cam action forces the carriages 112 in the direction of the arrows shown in Figures 15 and 16. The channels 74 and channel jaws 75 on the bracket 23 guide and hold the carriages 112 so they can reciprocate in the way intended so as to operate the bars 50. When the carriage is in the position shown in Figure 15, each pair of coils 30 of springs 40 are in the process of being fastened to each other by the helical springs 32, and the rollers 76 used for manipulating locking plugs 77 are inserted to their limit. This is because the spring 78 pulls on the plug 77 and the rail 79 is cut down to its least depth at that point. The vertical post 67 mounted on the bracket 23 provides a guide for the locking plug 77. The plug 77 passes through a hole 80 in the bracket 23 and lodges in back of bar 50 which supports the pads 27 having coils 40 thereon ready for fastening. This plug 77 prevents the bar 50 from moving backwards. (See Figure 20.) A pusher 81 bevelled on one side at 85 engages the front of the same bar 50 and prevents it from moving. The plug 77 is released and lifted out of the hole 80, when the rail 79 is pushed forwards with the carriage 112 and its slanting surface 82 acts on the roller 76, when the carriage is moving frontwards. The carriage 112 carries the pusher 81 along in its socket 83, where it is resiliently pressed outwardly, with the pusher 81 moving in the long slot 86. When the pusher 81 has travelled sufficiently, its bevelled face 85 strikes the next bar 50 and is forced back, as indicated in Figure 21. The pusher 81 eventually passes behind the next bar 50 and slips in back of the latter by means of a spring 26 in a position ready to pull it along when the carriage 112 moves in a rearward direction. It can be seen, in Figure 22, how the pusher 81 and plug 77 are functioning at this moment. The carriage is ready to pull the bars 50 backwards without opposition and place the next pads into position for fastening the coils 30 of the springs 40 placed thereon by the operator.

Figure 23:
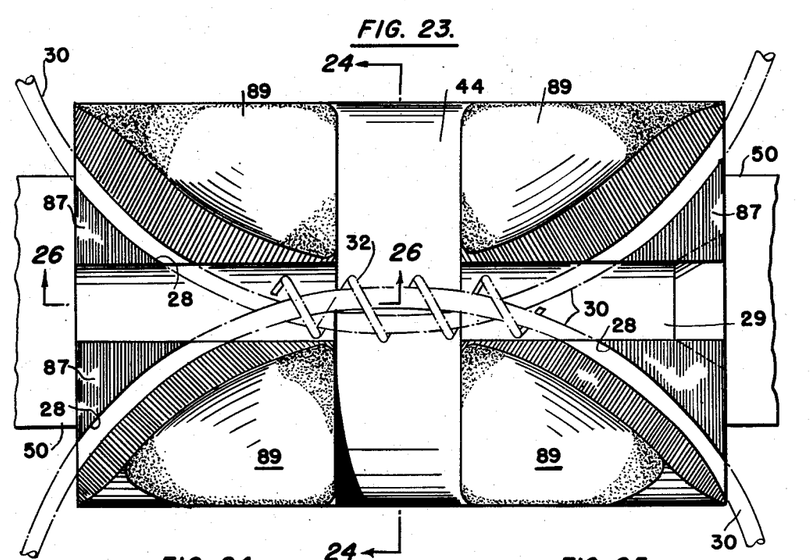
Figure 23 is a plan view of the spring holding die.
Figure 24:
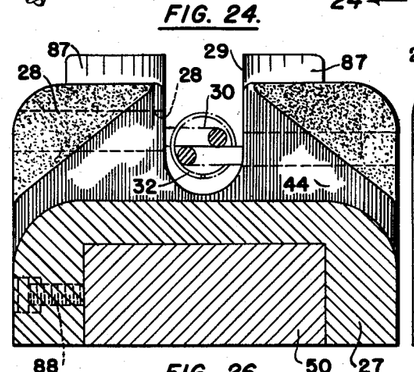
Figure 24 is a section taken on the line 24—24 of Figure 23.
Figure 25:
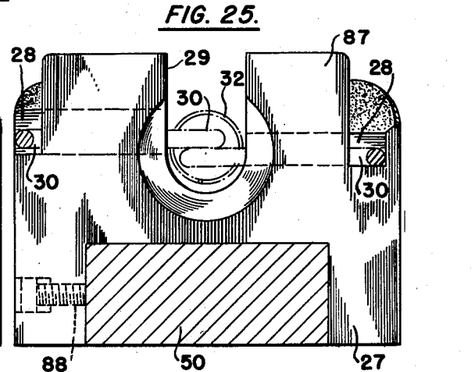
Figure 25 is a right end view of the spring holding die shown in Figure 23.
Figure 26:
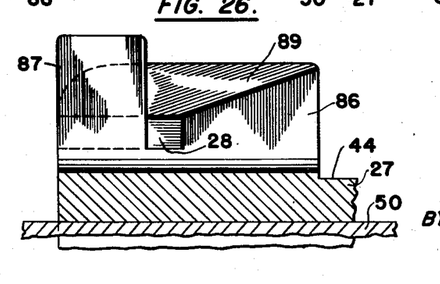
Figure 26 is a section taken on the line 26—26 of Figure 23.
Figure 27:
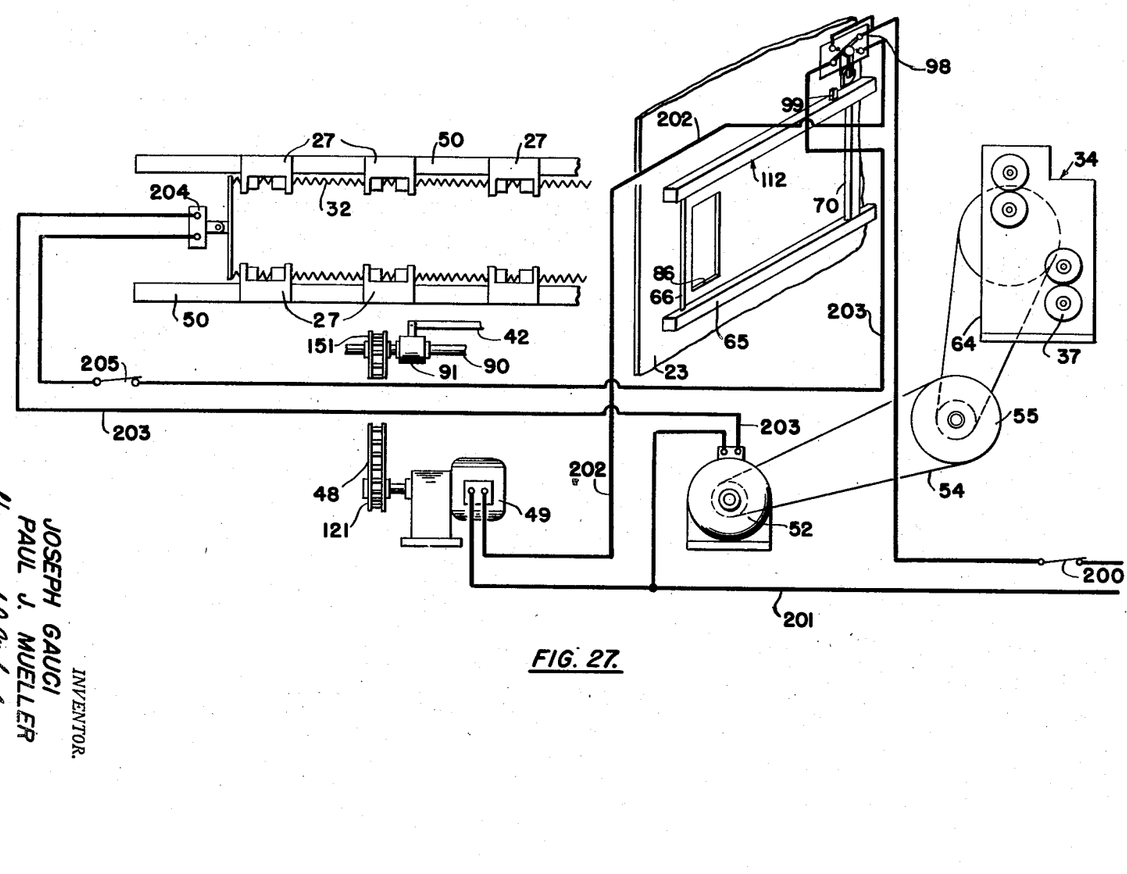
Figure 27 is a wiring diagram pertaining to the device.

After the pads 27 are relocated after travelling the 90° spacing and stop, they are filled with a new row of springs 40 in the manner described. In Figures 23, 24, 25 and 26, the structure of the pads are shown in detail. The groovings 28 are of arcuate form adapted to conform with the contour of the two adjacent coils 30 and set the latter one on top of the other at their tangential contact. The contact of the turns is made along the axis of the pad where an axial groove 29 is located as it extends longitudinally across the pad. In this groove 29, the helical 32 is projected and rotated so it will thread about the turns or coils 30 as indicated in Figures 23, 24 and 25. The bosses 87 on the pads 27 act as stops to guide the coils 30 into the grooves 28. The pads are secured to the bars 50 by the set screws 88. The slanting surface 89 of the pad facilitates the placing of the coils 30 in the groovings 28.

Figure 8:
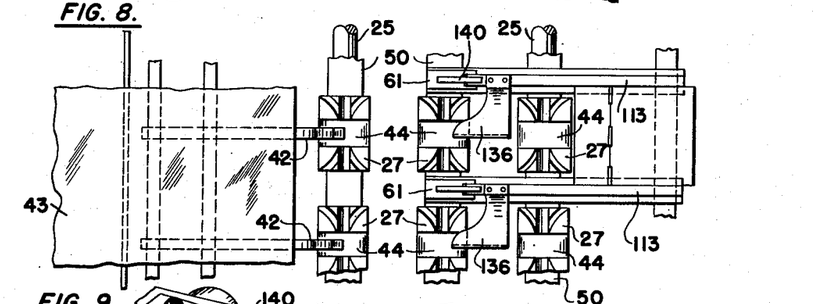
Figure 8 is a plan taken on the line 8—8 of Figure 7.
Figure 9:
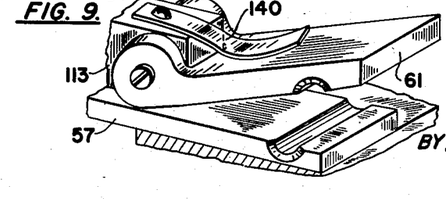
Figure 9 is an enlarged perspective view of the centering device for the helical wire.

The motor 49 through its transmission chain 48 drives a line shaft 90 journalled on the frame 22. The shaft 90 has a clutch 91 interconnected between the transmission 48 and the shaft, so that a pedal mechanism 92 can throw it in and out of engagement, whenever the operator chooses to step on or off it. The action is conventional, and the pedal 93 is mounted on inner platform 51 by means of brackets 94, so as to be accessible to the operator. The pedal 93 consists of a long bar designed to allow ample movement for the control of the mechanism 92. When the line shaft 90 is rotated by the motor 49, it revolves the sprockets 95 at either end. These sprockets 95 through the chains 96 actuate the sprockets 97 keyed to the shafts 47 on which the cams 46 are attached. When these cams 46 rotate they reciprocate the respective carriages 112, which in turn move the bars 50 like a conveyor belt until the operator moves the pedal and shuts off the power, or a limit switch 98 on the bracket 23 is tripped by a lug 99 on the carrier 112. When the carriers are stopped and the pads 27 located in the proper position for fastening one coil to another, they are located with the grooves 29 in line with the guide pipes 39 used for directing the helices 32 into them. The alignment is brought about by automatically engaging the bars 50 when they have travelled to a certain point after each threading of a helix has been accomplished. The threading of the helically formed wires 32 continues through the turns of all coil pairs 30 in a row until they have been bound by them and their end portions. At the helical spring feeding end cut off shears are positioned and tensioned by spring 130. The shears consist of two cutting bars 100 having a reciprocating movement in a plate structure 101, which is channelled to receive and guide them. Plate structure 101 is fastened to bars 152 which are notched to receive shearing pads 153 which cooperate with cutting bars 100 to sever the helices 32 from their forming mechanism. The pins 102 on the shears operate in slots 103 which limit their travel. The ends 104 of the shear bars 100 are diagonally cut and coact with a sliding bar 120 having its surfaces 106 slantingly positioned for the purpose. The movement of the sliding bar 120 in one direction opens the shears, and in the other closes it. Cutters 107 on the bars 100 cut the wires 32 when they move against them. The sliding bar 120 has a head 108 to keep it from being pulled away from the shears and it is reciprocated by the movement of the carriage 112 and spring 110. The spring 110 is fastened to the stationary guide 111 in which the sliding bar 120 reciprocates. The shears have a spring 130 secured to end pins 102 to provide a tension on the bars 100 tending to keep them in closed position and pressed against the slanting surfaces 106 of the sliding bar 120. The free end of the sliding bar 120 is pressed inwardly to cause the cutting bars 100 to cut the helical springs 32 when it is contacted by an adjusting screw 122 mounted on the cross bar 70 by means of a bracket 123. When the pads 27 reach the position where they are aligned with the guide tubes 39, the coils 30 of the springs 40 are held in the grooves 28 by clamps 136 which are positioned over the groove 44 in a manner to miss contact with the rest of the structure of spring 40, and holds the coils 30 in the groove 28 of the pad 27 as shown in Figure 8. The rollers 37 are driven by gears 150 through contact with a driver 141 attached to shaft 142.

Figure 10:
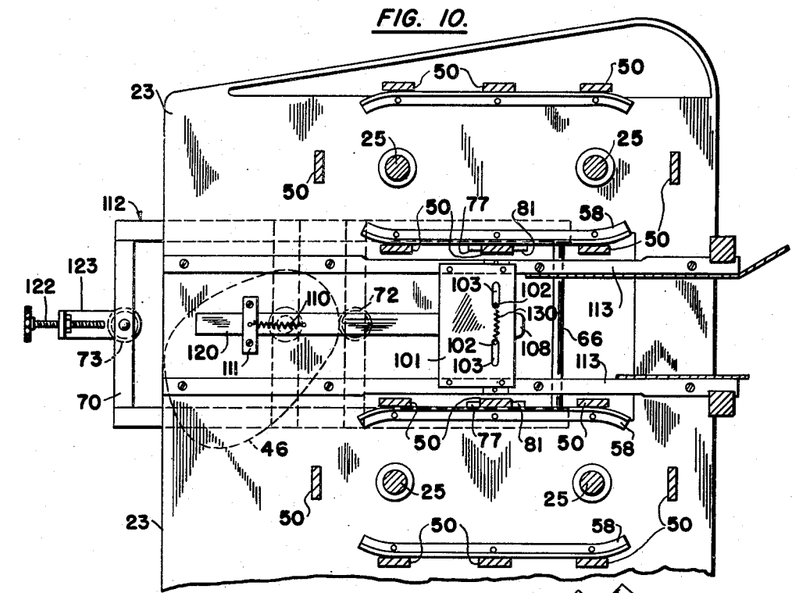
Figure 10 is a section taken on line 10—10 of Figure 4.
Figure 11:
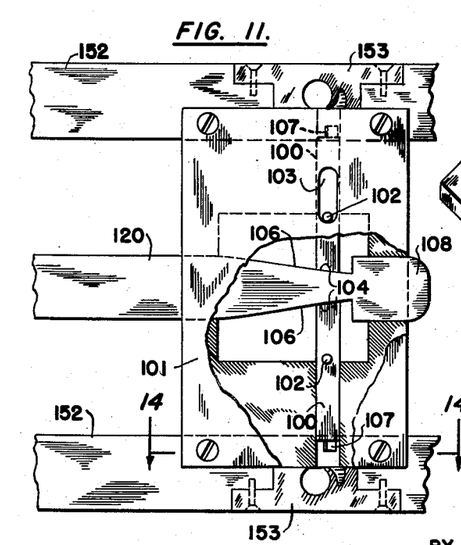
Figure 11 is an enlarged elevation of the knife mechanism showing the cover plate, partially broken away.
Figures 12, 13:
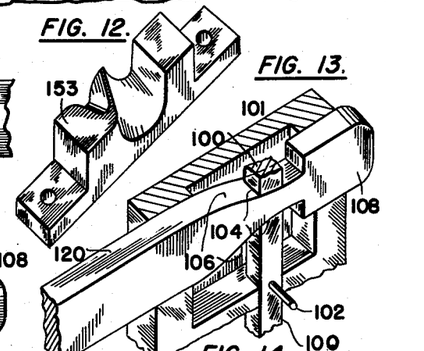
Figure 12 is an enlarged perspective view of the helical wire shearing pad and supporting means.
Figure 13 is a perspective view of the knife mechanism with the cover removed to show its inner construction.
Figure 14:
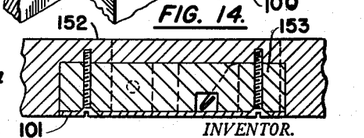
Figure 14 is a section taken on line 14—14 of Figure 11.
Figure 15:
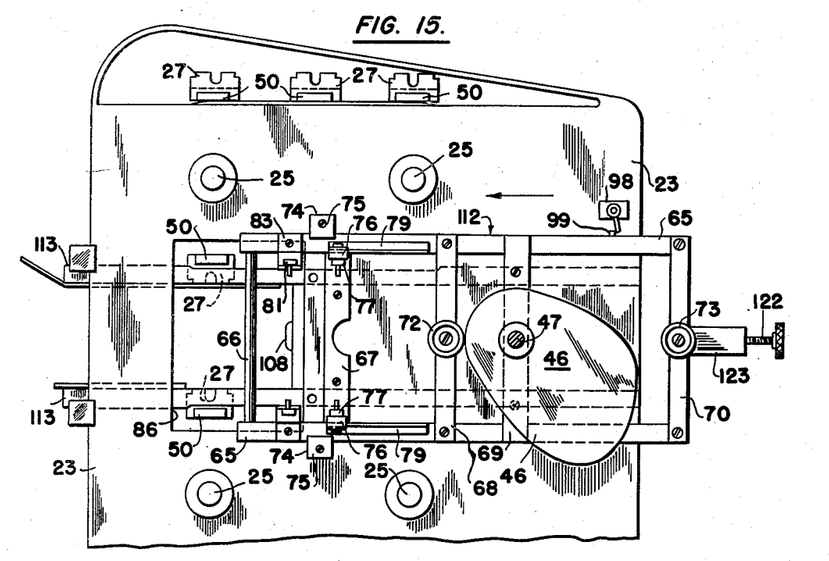
Figure 15 is an end view looking in the direction of arrows 15—15 of Figure 4, showing the sliding carriage in its extreme rearward position.
Figure 16:
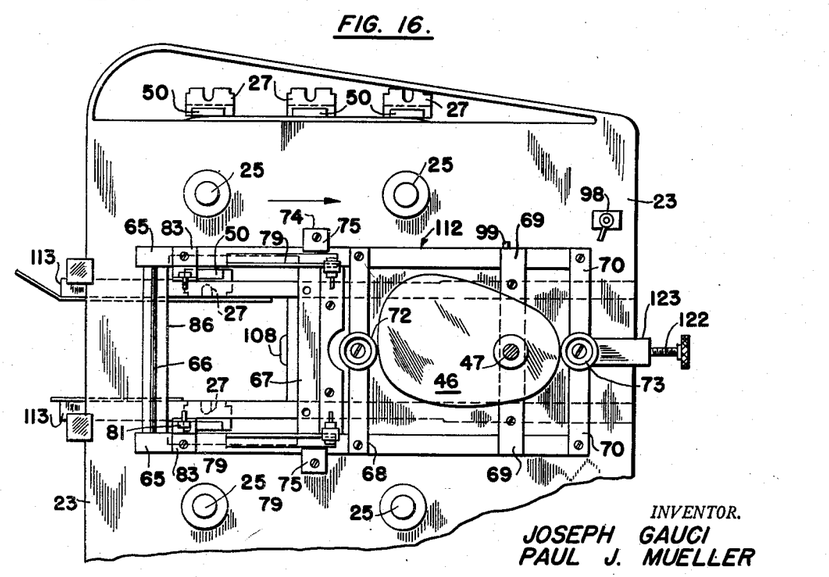
Figure 16 is an end view similar to Figure 15 but showing the sliding carriage in its extreme forward position.
Figures 17, 18, 19:
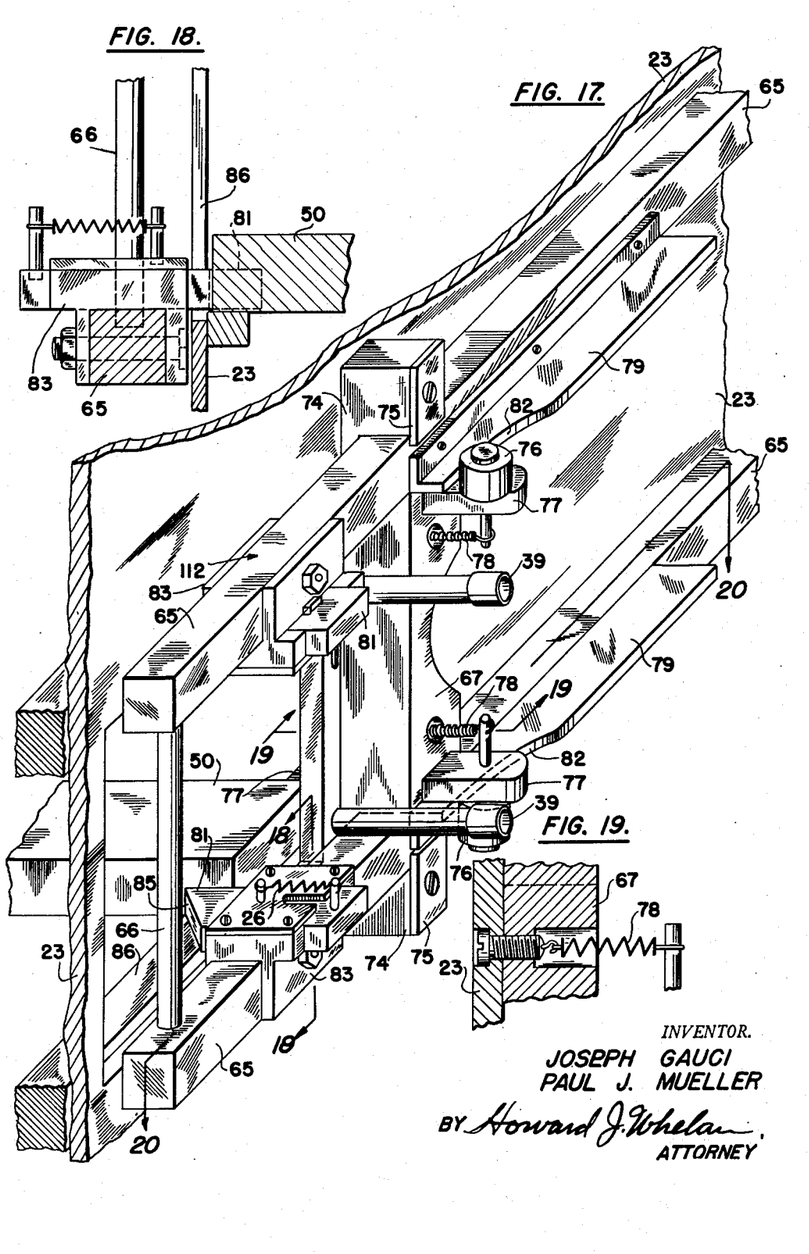
Figure 17 is a perspective view partially showing the sliding carriage and accompanying mechanism.
Figure 18 is a section taken on line 18—18 of Figure 17.
Figure 19 is a section taken on the line 19—19 of Figure 17.

In the operation of the machine, the springs 40 are fed into the grooves 28 of a row of pads 27. In the diagram the main switch 200 is closed so the circuit 201 energizes the motor 49 and through its sprocket 121 drives the chain 48, that operates the sprocket 151 attached to clutch 91. The pedal 93 is then tred on and through its mechanism 92 actuates the clutch 91 so it rotates the shaft 90. The shaft 90 through its sprocket 95 operates the chain 96 and sprocket 97 attached to the shaft 47. This shaft 47 rotates the cams 46 which in turn contact the rollers 73 and move the carriage 112 to the rear of the machine as shown in Figure 15. The pusher 81 on the carriage 112 resiliently moving in back of the bar 50, engages with the latter and moves the pads 27 with springs 40 thereon backwards, for one spacing. The lug 99 on the carriage 112 when it reaches the backward end of its travel, actuates the adjustable time delay switch 98, opens the circuit 202 and stops the motor 49. At the same time, the circuit 203 is closed by the same switch and energizes the motor 52. This motor 52 operates the helix and feeding mechanism that feeds the helix 32 and interlaces the turns 30 of the springs 40 together. The helix 32 rotates and moves linearly through the last pair of springs 40 in the row and projects therebeyond, to strike the limit switch 204. This switch opens the circuit line 203 so that the motor 52 stops. When the motor 52 stops through the action of the limit switch 204 the circuit feeding the motor 49 is closed by the time delay switch 98 and returns the carriage 112 to its forward position. During the return of the carriage to its forward position the sliding bar 120 slidably positioned on the bracket 23 as shown in Figure 10, is contacted by the adjusting screw 122 which slides the bar 120 inwardly, causing its tapered faces 106 to force the shears 100 upwardly and downwardly to cut the helices 32 loose from the helical feeding mechanism. During the time the helices are being interlaced around the upper and lower coils 30 of the springs 40 the operator is placing a new row of springs on the pads 27. When a mattress is started the switch 205 on circuit 203 is opened, the first row of springs are placed in the pads 27, the treadle 93 is depressed causing the row of springs to travel backwards for one space, a second row of springs 40 are positioned on the next set of pads, the switch 205 is closed, and the treadle 93 is depressed causing the second row of springs to travel backwards for one space, at this point the motor 52 is started by switch 98 and causes the helices 32 to be formed and fed helically around the coils 30 of the springs 40 to be bound together, from this point the operation becomes automatic as explained in the first part of the operation.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. In an apparatus for making spring assemblies, the improvement in the activating means for moving the coils to the interlacing station consisting of a support member, a plurality of pads for holding the coils mounted on bars, and means for actuating said bars mounted on the support consisting of a carriage, a cam for reciprocating the carriage, a resilient pushing means mounted on the carriage, a resilient abutment for holding the bars and pads at the interlacing station, and other means carried by the carriage for releasing the abutment so that the bars may be pushed past the interlacing station.

2. In apparatus as set forth in claim 1, wherein the pads have upstanding, spaced-apart bosses to guide the spring coils to arcuate groovings, said pads also having an axial groove between the bosses to receive the adjacent ends of the coils and the helical spring, said pads further having slanting grooves extending downwardly and outwardly from the axial groove to permit access therethrough to the underside of the coils.

JOSEPH GAUCI.
PAUL J. MUELLER.

References Cited in the file of this patent

UNITED STATES PATENTS

| Number | Name | Date |
| --- | --- | --- |
| 1,913,353 | Hager et al. | June 6, 1933 |
| 2,026,276 | Erickson | Dec. 31, 1935 |
| 2,012,904 | Bowersox | Aug. 27, 1935 |
| 2,059,117 | King | Oct. 27, 1936 |
| 2,161,689 | Strandberg | June 6, 1939 |
| 2,262,994 | Dickey | Nov. 18, 1941 |
| 2,265,426 | Foster | Dec. 9, 1941 |
| 2,296,878 | Saval | Sept. 29, 1942 |
| 2,351,659 | Bronstien | June 20, 1944 |
| 2,352,569 | Rymland et al. | June 27, 1944 |
| 2,388,106 | Woller | Oct. 30, 1945 |